(12) United States Patent
Ezenyilimba et al.

(10) Patent No.: US 7,696,122 B2
(45) Date of Patent: Apr. 13, 2010

(54) ELECTROCATALYST INKS FOR FUEL CELL APPLICATIONS

(75) Inventors: Matthew C. Ezenyilimba, Albuquerque, NM (US); Paolina Atanassova, Albuquerque, NM (US); Hanwei Lei, Albuquerque, NM (US); Ross A. Miesem, Albuquerque, NM (US); Ryan Cash Wall, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 644 days.

(21) Appl. No.: 11/428,747

(22) Filed: Jul. 5, 2006

(65) Prior Publication Data

US 2008/0009409 A1    Jan. 10, 2008

(51) Int. Cl.
| | |
|---|---|
| *B01J 31/00* | (2006.01) |
| *B01J 37/00* | (2006.01) |
| *C08F 4/02* | (2006.01) |
| *C08F 4/60* | (2006.01) |
| *C09D 11/00* | (2006.01) |
| *C09D 1/00* | (2006.01) |
| *C09D 4/00* | (2006.01) |
| *C09D 5/00* | (2006.01) |
| *C09K 3/00* | (2006.01) |
| *H01M 4/00* | (2006.01) |

(52) U.S. Cl. ............... 502/103; 502/150; 502/159; 502/173; 106/31.92; 106/31.95; 429/40; 429/41; 429/42; 429/43; 429/44

(58) Field of Classification Search .......... 502/103, 502/150, 159, 173; 106/31.92, 31.95; 429/40–44
See application file for complete search history.

(56) References Cited

U.S. PATENT DOCUMENTS

| | | | |
|---|---|---|---|
| 3,376,168 A * | 4/1968 | Horowitz | 429/144 |
| 4,052,336 A | 10/1977 | van Montfoort et al. | |
| 6,341,856 B1 * | 1/2002 | Thompson et al. | 347/100 |
| 6,506,517 B2 * | 1/2003 | Michot et al. | 429/213 |
| 6,582,510 B1 | 6/2003 | Schwartz | |
| 6,639,032 B2 * | 10/2003 | Wang | 526/135 |
| 6,878,475 B2 * | 4/2005 | Wixom et al. | 429/33 |
| 7,053,125 B2 * | 5/2006 | Lewis et al. | 516/90 |
| 7,098,163 B2 * | 8/2006 | Hampden-Smith et al. | 502/101 |
| 7,108,915 B2 * | 9/2006 | Adams et al. | 428/403 |
| 7,208,437 B2 * | 4/2007 | Renock et al. | 502/117 |
| 2003/0130114 A1 | 7/2003 | Hampden-Smith et al. | |
| 2004/0028991 A1 * | 2/2004 | Gascoyne et al. | 429/42 |
| 2004/0038808 A1 | 2/2004 | Hampden-Smith et al. | |

(Continued)

FOREIGN PATENT DOCUMENTS

EP    0826751    3/1998

(Continued)

OTHER PUBLICATIONS

Written Opinion for PCT/US2007/072707.*

(Continued)

*Primary Examiner*—Patricia L Hailey
(74) *Attorney, Agent, or Firm*—Roberts Mlotkowski Safran and Cole, P.C.

(57) ABSTRACT

An electrocatalyst ink composition comprising a liquid vehicle, particles comprising at least one electrocatalyst metal, and at least one copolymer dispersant comprising at least one polyalkylene oxide segment.

22 Claims, 8 Drawing Sheets

U.S. PATENT DOCUMENTS

| | | | |
|---|---|---|---|
| 2004/0107869 A1* | 6/2004 | Velamakanni et al. | 106/31.92 |
| 2004/0225153 A1 | 11/2004 | Allcock et al. | |
| 2004/0265678 A1 | 12/2004 | Hommura et al. | |
| 2005/0079409 A1 | 4/2005 | Andelman et al. | |
| 2005/0151121 A1* | 7/2005 | Buche et al. | 252/500 |
| 2005/0256225 A1* | 11/2005 | Viola | 523/160 |
| 2006/0001726 A1 | 1/2006 | Kodas et al. | |
| 2006/0280997 A1* | 12/2006 | Yoo et al. | 429/40 |
| 2007/0160899 A1* | 7/2007 | Atanassova et al. | 429/44 |

FOREIGN PATENT DOCUMENTS

| | | | |
|---|---|---|---|
| JP | 11-080647 | * | 3/1999 |
| JP | 2006-309953 | * | 11/2006 |
| WO | 0205375 | | 1/2002 |
| WO | 03058735 | | 7/2003 |
| WO | WO 3058735 A2 | * | 7/2003 |

OTHER PUBLICATIONS

Steven A. Schwartz, Sallie J. Lee, Adam Chan, The Use of Comb-Branched Copolymers as Pigment Dispersants, Lyondell Chemical Company, Newtown Square, PA, Jun. 2004.

Notification of Transmittal of the International Search Report and International Search Report PCT/US2007/072707 dated Dec. 14, 2007.

International Preliminary Report on Patentability and Written Opinion of the International Searching Authority mailed Jan. 15, 2009.

* cited by examiner

ELECTROCATALYST INKS FOR FUEL CELL APPLICATIONS

STATEMENT REGARDING FEDERALLY SPONSORED RESEARCH OR DEVELOPMENT

This invention was developed under National Institute of Standards (NIST) Advanced Technology Program (ATP) Cooperative Agreement #70NANB2H13021.

FIELD

This invention relates to electrocatalyst inks and their use in producing electrodes for fuel cells.

BACKGROUND

Fuel cells are electrochemical devices in which the energy from a chemical reaction is converted to direct current electricity. During operation of a fuel cell, a continuous flow of fuel, e.g., hydrogen (or a liquid fuel such as methanol), is fed to the anode while, simultaneously, a continuous flow of an oxidant, e.g., air, is fed to the cathode. The fuel is oxidized at the anode causing a release of electrons through the agency of a catalyst. These electrons are then conducted through an external load to the cathode, where the oxidant is reduced and the electrons are consumed, again through the agency of a catalyst. The constant flow of electrons from the anode to the cathode constitutes an electrical current which can be made to do useful work.

The Polymer Electrolyte Membrane fuel cell (PEMFC) is the most likely type of fuel cell to find wide application as a more efficient and lower emission power generation technology in a range of markets including stationary and portable power devices and as an alternative to the internal combustion engine in transportation. PEM fuel cells use a solid polymer as an electrolyte and porous carbon electrodes containing a platinum catalyst. They need only hydrogen, oxygen from the air, and water to operate and do not require corrosive fluids like some fuel cells. They are typically fueled with pure hydrogen supplied from storage tanks or onboard reformers.

The Direct Methanol Fuel Cell (DMFC) is similar to the PEMFC in that the electrolyte is a polymer and the charge carrier is the hydrogen ion (proton). However, liquid methanol ($CH_3OH$) is oxidized in the presence of water at the anode generating $CO_2$, hydrogen ions and the electrons that travel through the external circuit as the electric output of the fuel cell. The hydrogen ions travel through the electrolyte and react with oxygen from the air and the electrons from the external circuit to form water at the anode completing the circuit.

In the PEMFC the combined laminate structure formed from the membrane and the two electrodes is known as a membrane electrode assembly (MEA). The MEA will typically comprise several layers, but can in general be considered, at its basic level, to have five layers, which are defined principally by their function. On either side of the membrane an anode and cathode electrocatalyst is incorporated to increase the rates of the desired electrode reactions. In contact with the electrocatalyst containing layers, on the opposite face to that in contact with the membrane, are the anode and cathode gas diffusion substrate layers.

The anode gas diffusion substrate is designed to be porous and to allow the reactant hydrogen or methanol to enter from the face of the substrate exposed to the reactant fuel supply, and then to diffuse through the thickness of the substrate to the layer which contains the electrocatalyst, usually platinum-ruthenium metal based, to maximize the electrochemical oxidation of hydrogen or methanol. The anode electrocatalyst layer is also designed to comprise some level of the proton-conducting electrolyte in contact with the same electrocatalyst reaction sites. With acidic electrolyte types protons are produced as the product of the reaction occurring at the anode and these can then be efficiently transported from the anode reaction sites through the electrolyte to the cathode layers.

The cathode gas diffusion substrate is also designed to be porous and to allow oxygen or air to enter the substrate and diffuse through to the electrocatalyst layer reaction sites. The cathode electrocatalyst combines the protons with oxygen to produce water and is also designed to comprise some level of the proton-conducting electrolyte in contact with the same electrocatalyst reaction sites. Product water then has to diffuse out of the cathode structure. The structure of the cathode has to be designed such that it enables the efficient removal of the product water.

The complete MBA can be constructed by several methods. The electrocatalyst layers can be bonded to one surface of the gas diffusion substrates to form what is known as a gas diffusion electrode. The MEA is then formed by combining two gas diffusion electrodes with the solid proton-conducting membrane. Alternatively, the MEA may be formed from two porous gas diffusion substrates between which is sandwiched a solid proton-conducting polymer membrane having electrocatalyst layers on both sides (also referred to as a catalyst coated membrane or CCM); or indeed the MBA may be formed from one gas diffusion electrode, one liquid diffusion substrate and a solid proton-conducting polymer having an electrocatalyst layer on the side facing the gas/liquid diffusion substrate.

Although the theory behind fuel cell operation has been known for many years, there has been difficulty producing commercially viable fuel cells due to technological barriers, and also due to the availability of more cost-effective energy sources such as petroleum. However, devices using petroleum products, such as the automobile, produce significant pollution and may eventually become obsolete with the depletion of petroleum resources. As a result, there is a need for an alternative means for producing energy. Fuel cells are a promising alternative source of energy in that they are relatively pollution-free and utilize hydrogen, a seemingly infinite fuel source.

Among the critical issues that must be addressed for the successful commercialization of fuel cells are cell cost cell performance and operating lifetime. For stationary applications, improved power density is also critical. For automotive applications, high voltage efficiencies are necessary. In terms of cell cost and performance, one of the major issues is the construction and fabrication of the electrocatalyst layers used as the electrodes of the fuel cell, not least because of the fact that most fuel cells currently employ expensive noble metals, particularly platinum, as the or one electrocatalyst material.

Many different methods have been proposed for producing fuel cell electrodes, but most suffer from drawbacks that limit or prevent their commercial application. For example, one known method involves impregnating a porous support with a solution of a salt of an electrocatalyst metal, forming an oxide or hydroxide from the metal salt and reducing the oxide or hydroxide to the metal. Such a method is disclosed in, for example, U.S. Pat. No. 4,052,336 but generally results in poor control over the composition and microstructure of the catalyst powder, which are characteristics that have a critical impact on the performance of the catalyst.

An alternative method involves forming particles of the electrocatalyst metal, either alone or as coating on a particulate support phase, dispersing the metal particles into an ink and then applying the ink onto an electrode support or polymer membrane by, for example, ink-jet printing. One such method is disclosed in U.S. Patent Application Publication No. 2003/0130114 and comprises the steps of a) forming a liquid precursor comprising a particulate carbon precursor and at least a first precursor to an active species phase; b) generating an aerosol of droplets from said liquid precursor; and c) heating the aerosol droplets in a spray dryer at a conversion temperature of not greater than about 400° C. to form electrocatalyst particles wherein said first precursor is converted to an active species phase dispersed on the carbon support phase. The resultant electrocatalyst particles have a well-controlled microstructure and morphology and can be dispersed in an aqueous or organic liquid vehicle to produce an ink-jettable ink.

However, although inks are attractive deposition media for electrocatalyst metal particles, they suffer from the problem that, in view of the density of the electrocatalyst particles (frequently up to 20 gm/cc), it is difficult to maintain the particles adequately dispersed and suspended in the liquid vehicle. This problem is particularly pronounced when the ink is required to contain significant quantities of other components of the final catalyst layer, such as a proton-conducting polymer. At the same time, the viscosity of the liquid vehicle is limited by the requirement that the ink must be capable of being used with inkjet or similar print device. Thus, ensuring that the ink has a long shelf life, without frequent redispersion of the metal particles, can pose a significant challenge.

U.S. Patent Application Publication No. 2004/0038808, published Feb. 26, 2004, describes an ink composition useful for the formation of a catalyst layer and comprising: a) a liquid vehicle; b) a molecular precursor to an active species phase, wherein said molecular precursor can be converted to said active species phase at a temperature of not greater than about 200° C.; and c) particulate carbon. According to paragraph [0036], a variety of dispersants/additives can be added to the ink to assist in achieving a stable dispersion. In particular, fourteen commercially available dispersants were studied and, of these, DARVAN 7, a sodium polymethacrylate, water-soluble dispersant and DARVAN 821A, an ammonium polyacrylate, water soluble dispersant were found to be preferred in that neither were found to interfere adversely with the electrochemical process in a DMFC membrane electrode assembly.

Recent testing has, however shown that electrocatalyst ink compositions employing polyacrylate dispersants, such as DARVAN 821A, tend to undergo rapid settling, especially when the ink contains more than 5 wt % of a proton-conducting polymer. According to the present invention, it has now been found that electrocatalyst ink compositions, and especially aqueous electrocatalyst ink compositions, possessing enhanced stability can be produced by the inclusion in the composition of a copolymer dispersant including at least one polyalkylene oxide segment, particularly a comb-branched copolymer dispersant comprising at least one acrylic polymer segment and at least one polyalkylene oxide segment. The resultant inks have low settling rates even when containing more than 5 wt % of a proton-conducting polymer.

Comb-branched copolymers have already been described for use in the preparation of pigment dispersions. For example, U.S. Pat. No. 6,582,510 describes pigment dispersions comprising a pigment, a carrier and an acrylic/polyether comb-branched copolymer dispersant, wherein the polyether portion of the copolymer is free of any acidic groups. In addition, U.S. Patent Application Publication No. 2005/0256225, published Nov. 17, 2005, describes an aqueous inkjet ink composition comprising a) an aqueous vehicle, b) a modified pigment comprising a pigment having attached at least one organic group, and c) at least one comb-branched copolymer dispersant comprising at least one acrylic polymer segment and at least one polyalkylene oxide segment.

It is, however, to be appreciated that, with conventional pigment ink compositions, the pigments typically have a density of 2 gm/cc or less and are normally present in amounts less than 20 wt % of the overall ink composition. In contrast, with electrocatalyst ink compositions, the electrocatalyst metal particles frequently have a density up to 20 gm/cc and may be present in amounts in excess of 60 wt % of the overall ink composition. It is therefore unexpected that dispersants, such as comb-branched copolymer dispersants, that are effective in stabilizing pigment ink compositions should also be effective in stabilizing electrocatalyst ink compositions.

SUMMARY

In one aspect, the present invention resides in an electrocatalyst ink composition comprising a liquid vehicle, particles comprising at least one electrocatalyst metal, and at least one copolymer dispersant comprising at least one polyalkylene oxide segment.

Conveniently, the liquid vehicle comprises at least 50% wt of water and typically the ink composition further comprises a proton-conducting polymer.

Preferably, said at least one electrocatalyst metal is selected from platinum, silver, palladium, ruthenium, osmium, nickel, zirconium and alloys thereof. In one embodiment, said at least one electrocatalyst metal is supported on a particulate carrier material, such as carbon or a metal oxide.

Conveniently, said particles have an average size less than 200 nm and have a density of about 5 to about 20 gm/cc.

Preferably, said at least one electrocatalyst metal comprises 10 to 60 wt % of the ink composition.

In one embodiment, said dispersant is a comb-branched copolymer dispersant comprising at least one acrylic polymer segment and at least one polyalkylene oxide segment, and preferably an acrylic polymer backbone and at least one polyalkylene oxide side chain. Conveniently, the acrylic polymer segment comprises acrylic acid monomer units and the polyalkylene oxide segment comprises ethylene oxide monomer units and/or propylene oxide monomer units. Typically, the comb-branched copolymer dispersant has a molecular weight of from about 1,000 to about 100,000, such as from about 5,000 to about 80,000, for example from about 10,000 to about 50,000.

In a Further embodiment, said dispersant is a polyoxyalkyleneamine and conveniently a polyoxyalkyleneamine comprising primary amino groups attached to the terminus of a polyether backbone.

Preferably, the ink composition comprises greater than or equal to 30 parts by weight of the copolymer dispersant to 100 parts by weight of said at least one electrocatalyst metal.

In yet a further aspect, the invention resides in a method for the fabrication of an electrocatalyst layer, comprising the steps of: a) depositing an ink composition onto a substrate, said ink composition a liquid vehicle, particles comprising at least one electrocatalyst metal, and at least one copolymer dispersant comprising at least one polyalkylene oxide segment.

Preferably, said depositing step comprises depositing said ink composition using a direct-write tool such as an ink-jet device.

DETAILED DESCRIPTION OF THE EMBODIMENTS

Figure 1:
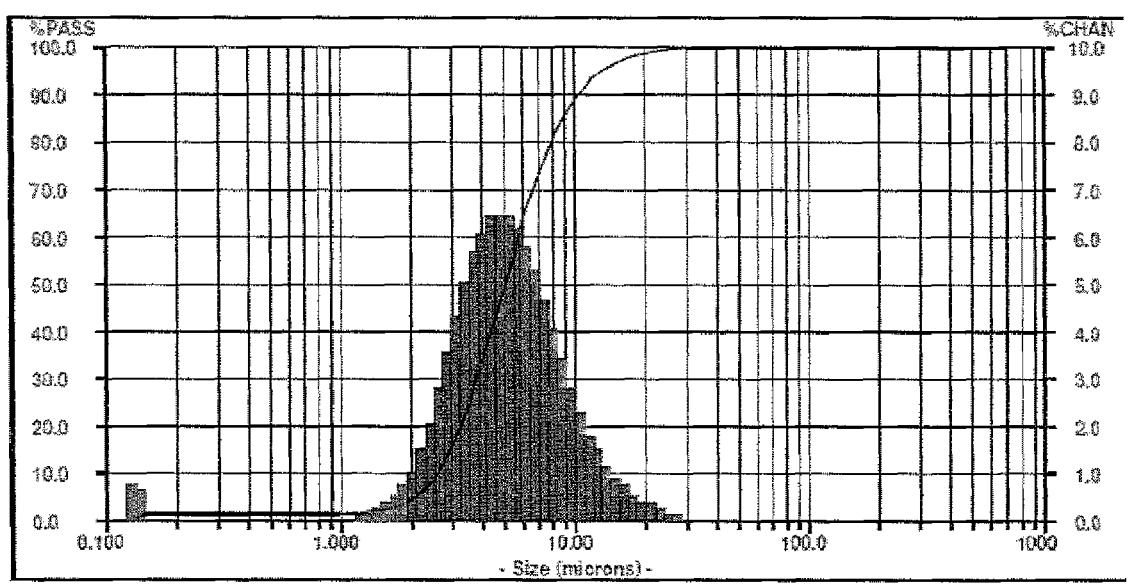
FIG. 1 is a graph showing the particle size distribution of the dispersion produced according to the Comparative Example employing Darvan 821A as a dispersant.

The term "ink composition" is used herein to refer to a dispersion of a particulate material in a vehicle carrier, which dispersion can be applied to a substrate by a variety of methods, such as filtration, vacuum deposition, spray deposition, casting, extrusion, rolling or printing such that the final ink formulation is capable of being used in a high volume production process for the deposition of an electrocatalytic layer. The ink of the present invention can be applied to substrates such as gas diffusion substrates, membranes, or decal blanks, providing an electrocatalytic layer in a simple operation.

The present invention is directed to an electrocatalyst ink composition and its use in a method for the fabrication of an electrocatalyst layer, particularly using a direct-write tool, such as an ink-jet device. The electrocatalyst ink composition comprises a liquid vehicle, particles comprising at least one electrocatalyst metal, and at least one copolymer dispersant comprising at least one polyalkylene oxide segment.

The liquid vehicle is normally aqueous based, by which is meant that the vehicle typically comprises at least 50 weight % water. The aqueous vehicle can, however, also contain water miscible solvents, such as alcohols, to increase the viscosity of the ink and/or to provide additional properties, such as to act as a humectant or a biocide. Examples of suitable alcohols include isopropanol and ethylene glycol. In some cases, organic solvent based systems can also be used. However, in general, these are not preferred especially where the electrocatalyst layer is intended for use in a fuel cell. Thus residues from organic solvents frequently act as poisons to fuel cell electrodes.

Dispersed within the liquid vehicle are particles comprising at least one electrocatalyst metal. The term "electrocatalyst" as used herein describes a catalyst that when incorporated into an electrode, such as a gas diffusion electrode, facilitates an electrochemical reaction. The particular electrocatalyst metal(s) employed will depend on the intended use of the ink but, for fuel cell use, preferred electrocatalyst metals include the platinum group metals and noble metals, particularly Pt, Ag, Pd, Ru, Os and their alloys. The metal phase can also include a metal selected from the group Ni, Rh, Ir, Co, Cr, Mo, W, V, Nb, Al, Ta, Ti, Zr, Hf, Zn, Fe, Cu, Ga, In, Si, Ge, Sn, Y, La, lanthanide metals and combinations or alloys of these metals. Preferred metal alloys include alloys of Pt with other metals, such as Ru, Os, Cr, Ni, Mn and Co. Particularly preferred among these is Pt/Ru for use in hydrogen anodes and Pt/Cr/Co for use in oxygen cathodes.

The electrocatalyst metal may be unsupported, or supported on a particulate conductive substrate, and preferably is supported on a high surface area particulate carbon. The electrocatalysts typically used in DMFC and/or PEMFC fuel cell applications are either supported metal catalysts, wherein the metal particles are dispersed over the surface of a carbon black, or are unsupported, finely divided metal blacks. Typically, where the electrocatalyst metal is supported on a particulate conductive substrate, the particles include from about 20 to about 90 weight percent of the active metal phase, with the preferred level depending upon the total surface area of the support, the type of active metal and the application of the powder. Where the metal is platinum or a platinum alloy supported on carbon for use in a fuel cell, the metal loading on the carbon support is preferably about 30 to about 99 weight % of the total particle, more preferably about 40 to about 90 weight % of the total particle, or even most preferably about 50 to about 75 weight % of the total particle.

Depending on whether the electrocatalyst metal is supported unsupported and, if supported, on the material of the support and the metal loading on the support, the electrocatalyst particles can have a density of about 5 to about 20 gm/cc. In this respect it will be appreciated that the electrocatalyst particles of the present ink composition are significantly different than the solid pigments that may be employed in conventional printing inks where the density of the pigment is typically of the order of about 1 to about 1.7 gm/cc.

The particle size of the electrocatalyst particles is not narrowly defined, although where, for example, the ink is to be used with an ink-jet printing device, the size should be less than the diameter of the orifices in the print head of the device. Typically, therefore the electrocatalyst particles have a maximum size of less than 3 micron, preferably less than 1 micron and a volume average (d50) particle size of about 150 nanometers to about 500 nanometers, preferably about 170 nanometers to about 300 nanometers. The particles may be produced and/or supplied with the desired particle size or can be milled to reduce the particle size to the desired value.

The amount of electrocatalyst metal in the overall ink composition is not critical, although in general comprises between about 1 and about 60 wt % of the ink composition, even between 10 and 60 wt %. More preferably, the ink composition contains between about 2 and about 20 wt % of the electrocatalyst metal.

The electrocatalyst ink composition of the invention also comprises at least one copolymer dispersant comprising at least one polyalkylene oxide segment. In one embodiment, the dispersant is a comb-branched copolymer, that is a copolymer comprising a polymeric backbone and multiple polymeric sidechains. In another embodiment, the dispersant comprises a polyoxyalkyleneamine. Preferably, the dispersant is water soluble.

Where the dispersant is a comb-branched copolymer, the copolymer preferably comprises at least one acrylic polymer segment and at least one polyalkylene oxide segment. Preferably, the acrylic polymer segment is the backbone of the comb-branched copolymer dispersant and the polyalkylene oxide segments are the side chains. Examples of such copolymers are described in U.S. Pat. Nos. 6,582,510, 6,214,958, 6,034,208, 5,614,017, 5,670,578, 5,985,989, and 5,834,576. Of the preferred acrylic-polyakylene oxide comb-branched copolymers, most preferred are those in which the acrylic polymer segment is a homo- or copolymer of acrylic acid or salts thereof and therefore may comprise acrylic acid and/or acrylic acid salt monomer units. In addition, the polyalkylene oxide segment comprises units of ethylene oxide, propylene oxide, or both.

The comb-branched copolymer has a molecular weight suitable for the material to function as a dispersant. Typically, the molecular weight is greater than about 500 and less than about 500,000. Preferred are copolymers having a molecular weight from about 1,000 to 100,000, more preferably from about 5,000 to about 80,000, and most preferably from about 10,000 to about 50,000.

The molecular weight of each of the polymeric segments of the comb-branched copolymer dispersant may vary within the overall copolymer molecular weight. For example, the molecular weight of the acrylic polymer segment may be between 30,000 and 150,000 (such as 38,000 to 127,000) and the molecular weight of the polyalkylene oxide segment may be less than 5,000 (such as 2,000 to 3,000).

Examples of suitable comb-branched copolymer dispersants include the Ethacryl® dispersants commercially available from Lyondell Chemical Company.

Alternatively, where the dispersant comprises a polyoxyalkyleneamine, the dispersant preferably comprises primary amino groups attached to the terminus of a polyether backbone. Examples of suitable amine dispersants include the Jeffamine® dispersants commercially available from Lyondell International LLC.

Typically, the dispersant is present in the present ink composition at a level from about 15 to about 100 parts by weight, preferably from about 30 to about 75 parts by weight, relative to 100 parts by weight of the electrocatalyst metal.

The electrocatalyst ink composition of the present invention may also comprise one or more proton-conducting polymers. The proton-conducting polymers suitable for use in the present invention may include, but are not limited to perfluorinated polymers. Suitable perfluorinated polymers include Nafion™, commercially available from E. I. DuPont de Nemours (U.S. Pat. Nos. 3,282,875; 4,329,435; 4,330,654, 4,358, 545; 4,417,969; 4,610,762; 4,433,082 and 5,094,995). The Nafion may be added to the ink dispersion in aqueous solution, but such a solution is typically acidic, whereas the remainder of the dispersion is basic. It is therefore normally necessary to add a basic buffer with the Nafion solution so that the dispersion remains basic. Otherwise, undesirable agglomeration of the electrocatalyst metal particles is likely to occur.

For many applications, it is important to simultaneously control the surface tension and the viscosity of the present ink composition. For example, where the composition is to be used with an industrial ink-jet device, the surface tension of the ink is preferably from about 10 to 50 dynes/cm, such as from about 20 to 40 dynes/cm, and the viscosity of the ink is preferably not greater than about 50 centipoise (cp), such as in the range of from about 10 cp to about 40 cp. Automated syringes can use compositions having a higher viscosity, such as up to about 5000 cp.

The ink composition according to the present invention can be deposited to form patterned or unpatterned layers using a variety of tools and methods. In one embodiment, the modified carbon ink is deposited using a direct-write deposition tool. As used herein, a direct-write deposition tool is a device that can deposit an electrocatalyst ink onto a surface by ejecting the composition through an orifice toward the surface without the tool being in direct contact with the surface. The direct-write deposition tool is preferably controllable over an x-y grid. One preferred direct-write deposition tool is an ink-jet device. Other examples of direct-write deposition tools include aerosol jets and automated syringes, such as the MICROPEN tool, available from Ohmcraft, Inc., of Honeoye Falls, N.Y.

An ink-jet device operates by generating droplets of a liquid suspension and directing the droplets toward a surface. The position of the inkjet head is carefully controlled and can be highly automated so that discrete patterns of the ink can be applied to the surface. Ink-jet printers are capable of printing at a rate of 1000 drops per second per jet, or higher, and can print linear features with good resolution at a rate of 10 cm/sec or more, such as up to about 1000 cm/sec. Each drop generated by the inkjet head includes approximately 25 to 100 picoliters of the suspension/ink that is delivered to the surface. For these and other reasons, ink-jet devices are a highly desirable means for depositing materials onto a surface.

Typically, an ink-jet device includes an ink-jet head with one or more orifices having a diameter of not greater than about 100 µm, such as from about 50 µm to 75 µm. Droplets are generated and are directed through the orifice toward the surface being printed. Ink-jet printers typically utilize a piezoelectric driven system to generate the droplets, although other variations are also used. Inkjet devices are described in more detail in, for example, U.S. Pat. Nos. 4,627,875 and 5,329,293 by Liker, each of which is incorporated herein by reference in its entirety. Ink-jet printing for the manufacture of DMFCs is disclosed in U.S. Patent Application Publication No. 20040038808, which is also incorporated herein by reference in its entirety.

The ink composition according to the present invention can also be deposited by aerosol jet deposition. Aerosol jet deposition can enable the formation of features having a feature width of not greater than about 200 µm, such as not greater than 100 µm, not greater than 75 µm and even not greater than 50 µm. In aerosol jet deposition, the modified carbon ink is atomized into droplets and the droplets are transported to a substrate in a flow gas through a flow channel. Typically, the flow channel is straight and relatively short. For use in an aerosol jet deposition, the viscosity of the ink is preferably not greater than about 20 cp.

The aerosol in the aerosol jet can be created using a number of atomization techniques, such as by ultrasonic atomization, two-fluid spray head, pressure atomizing nozzles and the like. Ultrasonic atomization is preferred for compositions with low viscosities and low surface tension. Two-fluid and pressure atomizers are preferred for higher viscosity inks.

The size of the aerosol droplets can vary depending on the atomization technique. In one embodiment, the average droplet size is not greater than about 10 µm, and more preferably is not greater than about 5 µm. Large droplets can be optionally removed from the aerosol, such as by the use of an impactor.

Low aerosol concentrations require large volumes of flow gas and can be detrimental to the deposition of fine features. The concentration of the aerosol can optionally be increased, such as by using a virtual impactor. The concentration of the aerosol can be greater than about $10^6$ droplets/cm$^3$, such as greater than about $10^7$ droplets/cm$^3$. The concentration of the aerosol can be monitored and the information can be used to maintain the mist concentration within, for example, 10% of the desired mist concentration over a period of time.

Examples of tools and methods for the deposition of fluids using aerosol jet deposition include U.S. Pat. No. 6,251,488, 5,725,672, 4,019,188. Each of these patents is hereby incorporated herein by reference in its entirety.

The ink composition of the present invention can also be deposited by a variety of other techniques including intaglio, roll printer, spraying, dip coating, spin coating and other techniques that direct discrete units, continuous jets or continuous sheets of fluid to a surface. Other printing methods include lithographic and gravure printing.

For example, gravure printing can be used with inks having a viscosity of up to about 5000 centipoise. The gravure method can deposit features having an average thickness of from about 1 μm to about 25 μm and can deposit such features at a high rate of speed, such as up to about 700 meters per minute. The gravure process also enables the direct formation of patterns onto the surface.

Lithographic printing methods can also be utilized In the lithographic process, the inked printing plate contacts and transfers a pattern to a rubber blanket and the rubber blanket contacts and transfers the pattern to the surface being printed. A plate cylinder first comes into contact with dampening rollers that transfer an aqueous solution to the hydrophilic non-image areas of the plate. A dampened plate then contacts an hiking roller and accepts the ink only in the oleophillic image areas.

Using one or more of the foregoing deposition techniques, it is possible to deposit an electrocatalyst layer on one side or both sides of a substrate (e.g., a ion exchange membrane) to form and/or modify a component of the fuel cell (e.g., an catalyst coated membrane). A particularly preferred substrate material is Nafion® (du Pont de Nemours and Co., Wilmington, Del., USA), which comprises a base in the form of a copolymer of tetrafluoroethylene and perfluorovinyl ether, on which sulfonate groups are present as ion-exchange groups. An alternative substrate for use as a proton exchange membrane is polybenzimidazole (PBI), to which ion exchange groups such as phosphoric acid groups can be added. Another suitable substrate for use as a proton exchange membrane is a hydrocarbon membrane.

The invention will now be more particularly described with reference to the following non-limiting Examples.

As used in the Examples, the reference to the "dx" particle size of a molecular sieve means that x percent by volume of a specified plurality of particles of the molecular sieve have a particle diameter no greater than the cited particle size. For example, the d50 value for a specified plurality of particles means that 50% by volume of the particles have a particle diameter no greater than the cited d50 value. The d50 value is also referred to as the average or median particle diameter. For the purposes of this definition, the particle size distribution (PSD) used to define the dx value is measured using well known laser scattering techniques using a Microtrac X100 Particle Analyzer. "Particle diameter" as used herein means the diameter of a specified spherical particle or the equivalent diameter of non-spherical particles as measured by laser scattering using a Microtrac X100 Particle Analyzer.

COMPARATIVE EXAMPLE

A black dispersion was prepared by mixing the following ingredients:
(a) 6.35 g of platinum, nominally 60-wt % on carbon black (supplied by Cabot Superior Micropowders);
(b) 63.5 g of deionized (DI) water; and
(c) 15.5 g of ammonium polymethacylate dispersant Darvan 821A at 40% solids (supplied by R. T. Vanderbilt).

The above components were mixed and then sheared using a Silverson Model UK high shear mixer for 5 minutes at 9800 rpm. The mixture was then transferred to an Eiger Mini Mill that was charged with 0.6 to 0.8 mm zirconium oxide beads and milled at 4000 rpm. The milling was stopped after 8 minutes since the dispersant was not wetting and stabilizing efficiently the newly generated surfaces. The viscosity kept rising and the addition of more dispersant did help to lower the viscosity. The dispersion was separated from the milling media by pumping the ink out of the mill. Particle size distributions were obtained on diluted milled samples using a Microtrac X100 Particle Analyzer and the results are shown in FIG. 1 and listed Table 1 for the Comparative Sample.

Figure 2:
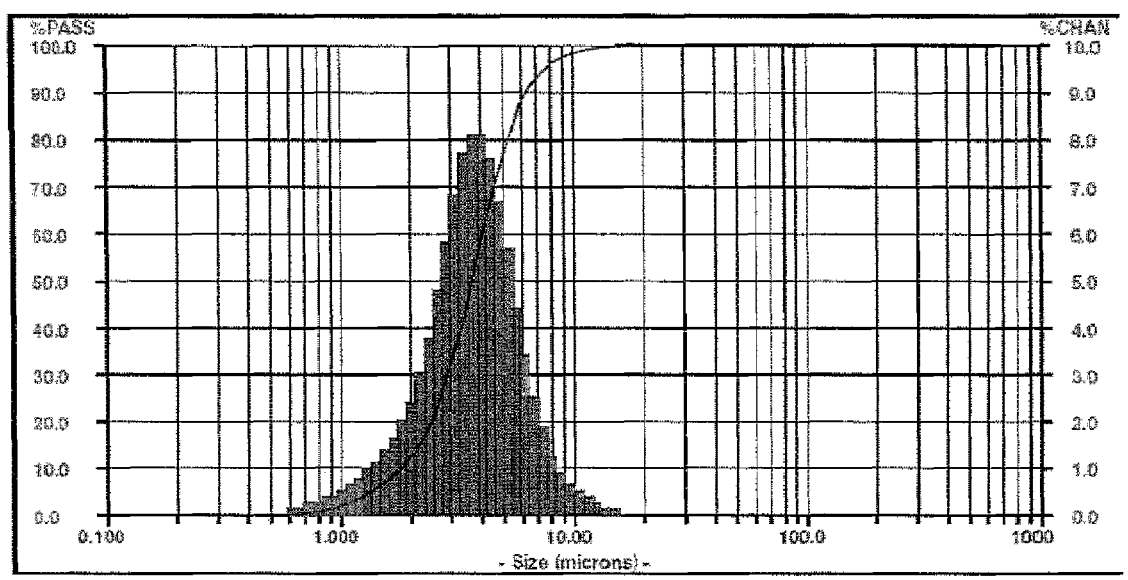
FIG. 2 is a graph showing the particle size distribution of the dispersion produced according to the Control Example employing no dispersant.

The procedure was repeated but with the Darvan dispersant being omitted and the milling being terminated after 8 minutes. Particle size distributions were obtained on diluted milled samples using a Microtrac X100 Particle Analyzer and the results are shown in FIG. 2 and listed Table 1 for the Control Sample.

EXAMPLE 1

A black dispersion was prepared by mixing the following ingredients:
(a) 10.08 g of platinum, nominally 60-wt % on carbon black (supplied by Cabot Superior Micropowders as Dynalyst™ 60K);
(b) 18.82 g of polyetheralkanolamine comb polymer 85% sulfonated Jeffsperse dispersing agent at 40% solids in water (supplied by Huntsman);
(e) 49 g deionized (DI) water; and
(d) 60 g ethylene glycol.

The above components were mixed and then sheared using a Silverson Model L4R high shear mixer for 5 minutes at 9800 rpm. The mixture was then transferred to an Eiger Mini Mill that was charged wit 0.6 to 0.8 mm zirconium oxide beads and milled at 5000 rpm for 2 hours. The dispersion was separated from the milling media by pumping the ink out of the mill. Particle size distributions were obtained on diluted milled samples using a Microtrac X100 Particle Analyzer and the results are given in Table 1 for Sample 1(a).

Homogenizing the milled material through a Microfluidics Microfluidizer Model 110S fluid processor further reduced the ink particle size as shown in Table 1 under Sample 1(b). One portion of the resultant homogenized ink was stored under ambient conditions and the dispersion was found to be stable for 8 days in that there was no substantial growth in particle size over the 8 day period. The remainder of the homogenized ink was filtered using a Whatman 5 micron filter and was found to have the particle size distribution shown in FIG. 2 and given in Table 1 under Sample 1(c).

EXAMPLE 2

A black dispersion was prepared by mixing the following ingredients:
(a) 11.76 g of platinum, nominally 60-wt % on carbon black (supplied by Cabot Superior Micropowders as Dynalyst™ 60K);
(b) 10.97 g of polyetheralkanolamine comb polymer epoxide dispersing agent at 100% solids (supplied by Huntsman); and
(c) 83.07 g deionized (DI) water.

The above components were mixed and then sheared using Silverson Model L4R high shear mixer for 5 minutes at 9800 rpm. The mixture was then transferred to an Eiger Mini Mill that was charged with 0.6 to 0.8 mm zirconium oxide beads and milled at 5000 rpm for 2 hours. The dispersion was separated from the milling media by pumping the ink out of the mill. Particle size distributions were obtained on diluted milled samples using a Microtrac X100 Particle Analyzer and the results are given in Table 1 for Sample 2(a).

Figure 3:
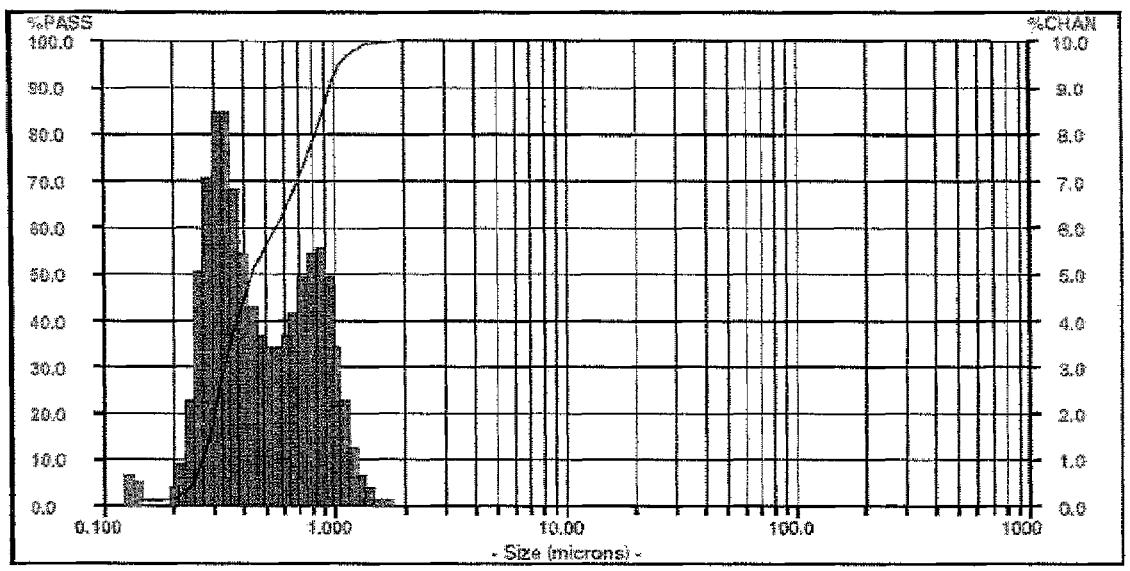
FIG. 3 is a graph showing the particle size distribution of the dispersion produced as Sample 1(c) in Example 1 employing a comb polymer dispersant

Homogenizing the milled material through a Microfluidics Microfluidizer Model 110S fluid processor further reduced the ink particle size as shown in Table 1 under Sample 2(b). One portion of the resultant homogenized ink was stored under ambient conditions and the dispersion was found to be stable for 8 days. The remainder of the homogenized ink was filtered using a Whatman 5 micron filter and was found to have the particle size distribution shown in FIG. 3 and given in Table 1 under Sample 2(c).

EXAMPLE 3

A black dispersion was prepared by mixing the following ingredients:
- (a) 10.0 g of platinum, nominally 60-wt % on carbon black (supplied by Cabot Superior Micropowders as Dynalyst™ 60K);
- (b) 17.7 g of polyetheralkanolamine comb polymer X3204 dispersing agent at 40% solids (supplied by Huntsman) and
- (c) 63.5 g of deionized (DI) water.

The above components were mixed and then sheared using a Silverson Model L4R high shear mixer for 5 minutes at 9800 rpm. The mixture was transferred to an Eiger Mini Mill that was charged with 0.6 to 0.8 mm of zirconium oxide beads and milled at 5000 rpm for 35 minutes. The dispersion was separated from the milling media by pumping the ink out of the mill. Particle size distributions were obtained using a Microtrac X100 Particle Analyzer after homogenizing the milled material through a Microfluidics Microfluidizer Model 110S fluid processor and the results are given in Table 1 for Sample 3(a).

The homogenized ink was filtered using a Whatman 5 micron filter and the resultant filtered ink had the particle size distribution given in Table 1 under Sample 3(b).

Figure 4:
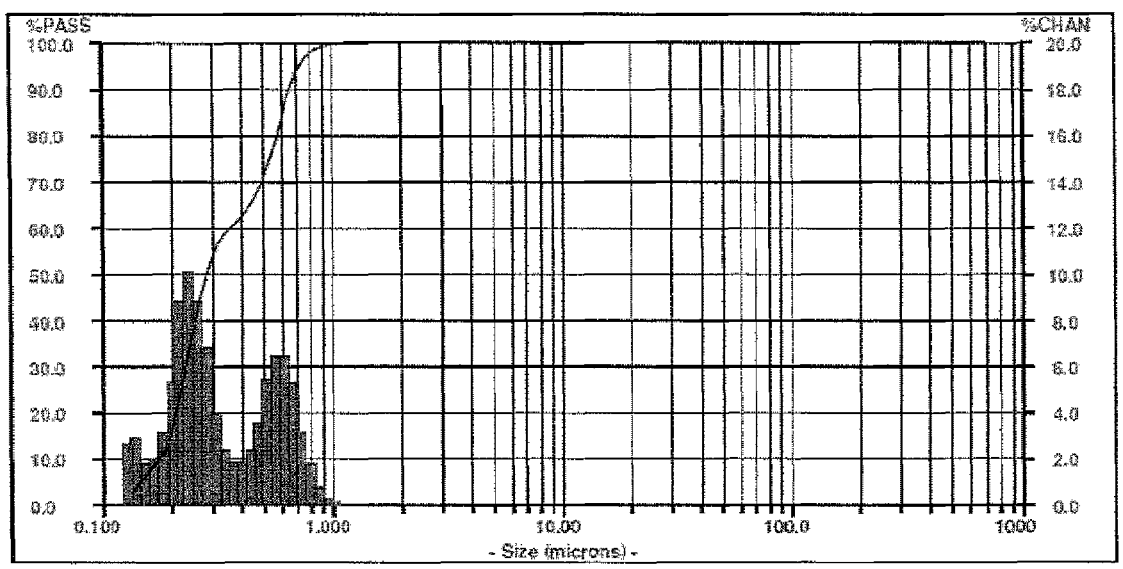
FIG. 4 is a graph showing the particle size distribution of the dispersion produced as Sample 2(c) in Example 2 employing a comb polymer dispersant.

To 8.38 g of the filtered homogenized ink were mixed 2.1 g of a $NH_4OH$ buffer solution having a pH 11.09 and then 1.6 g of 10% Nafion solution in water. After filtration, the resultant ink was found to have the particle size distribution shown in FIG. 4 and given in Table 1 under Sample 3(c).

EXAMPLE 4

A black dispersion was prepared by mixing the following ingredients:
- (a) 7.32 g of platinum, nominally 60-wt % on carbon black (supplied by Cabot Superior Micropowders as Dynalyst™ 60K);
- (b) 18.86 g of polyetheralkanolamine comb polymer X3204 dispersing agent at 40% active (supplied by Huntsman);
- (c) 44.15 g of pH 11.5 $NH_4OH$ solution.

Figure 5:
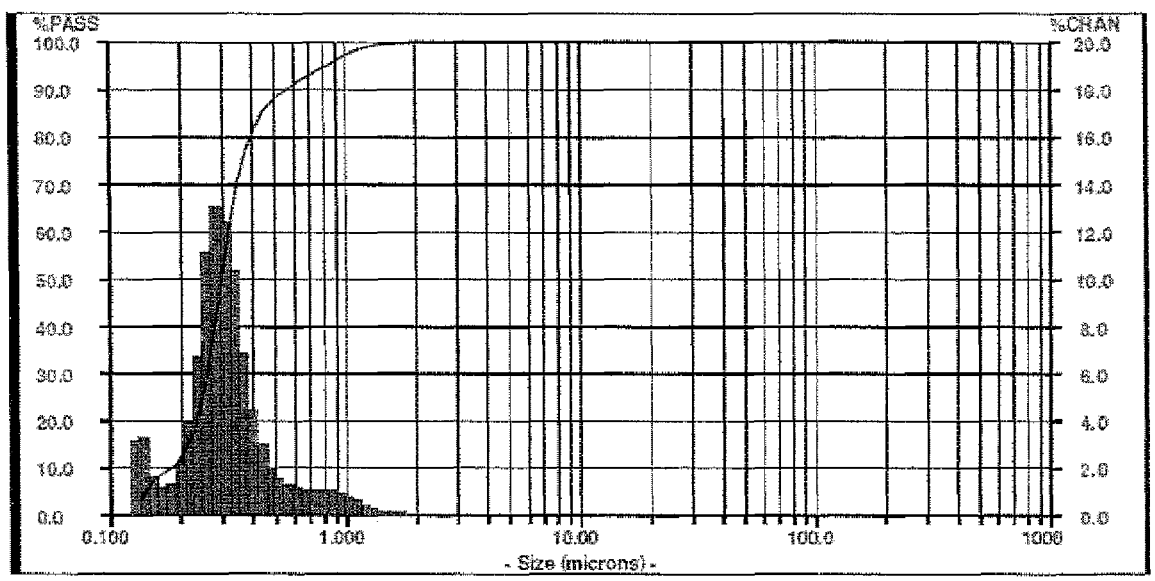
FIG. 5 is a graph showing the particle size distribution of the dispersion produced as Sample 3(c) in Example 3 employing a comb polymer dispersant.

The above components were mixed and then sheared using a Silverson Model L4R high shear mixer for 5 minutes at 9800 rpm. The mixture was then transferred to an Eiger Mini Mill that was charged with 0.6 to 0.8 mm zirconium oxide beads and milled at 5000 rpm for 30 minutes. At the end of the 30-minute milling, 10.7 g of 10% Nafion solution was added to the mixture and the milling continued for additional 5 minutes with more dispersant. The dispersion was separated from the milling media by pumping the ink out of the mill. Particle size distributions were obtained using a Microtrac X100 Particle Analyzer after homogenizing the milled material through a Microfluidics Microfluidizer Model 110S fluid processor and filtering the homogenized ink using a Whatman 5 micron filter. The results are shown in FIG. 5 and given in Table 1 for Sample 4.

A portion of the filtered homogenized ink was stored under ambient conditions and the dispersion was found to be stable for 3 days.

EXAMPLE 5

A black dispersion was prepared by mixing the following ingredients.
- (a) 7.61 g of Platinum, nominally 60-wt % on carbon black (supplied by Cabot Superior Micropowders as Dynalyst™ 60K);
- (b) 8.14 g of Ethacryl P dispersing agent at 37.7% active (supplied by Lyondell); and
- (c) 48.2 g DI water.

The above components were mixed and then sheared using a Silverson Model L4R high shear mixer for 5 minutes at 9800 rpm. The mixture was transferred to an Eiger Mini Mill that was charged with 0.6 to 0.8 mm zirconium oxide beads and milled at 5000 rpm for 30 minutes. The dispersion was separated from the milling media by pumping the ink out of the mill. Particle size distributions were obtained using a Microtrac X100 Particle Analyzer after homogenizing the milled material through a Microfluidics Microfluidizer Model 110S fluid processor. The results are given in Table 1 for Sample 5(a).

The homogenized ink was filtered using a Whatman 5 micron filter and the resultant filtered ink had the particle size distribution given in Table 1 under Sample 5(b).

Figure 6:
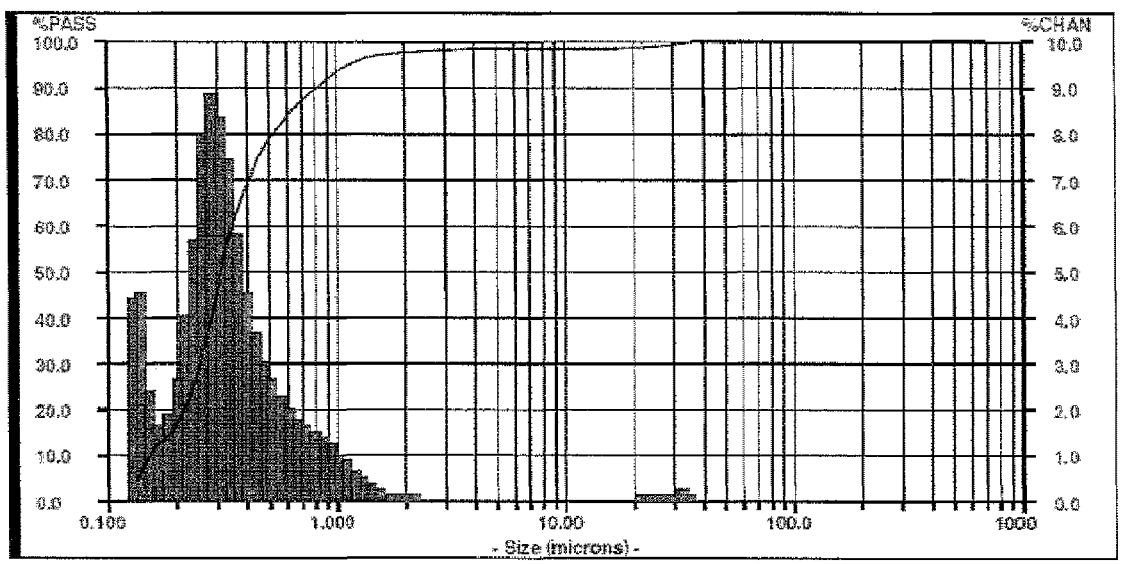
FIG. 6 is a graph showing the particle size distribution of the dispersion produced as Sample 4 in Example 4 employing a comb polymer dispersant.

With 8.84 g of the filtered, homogenized ink were mixed 2.23 g of $NH_4OH$ solution having pH 11.09 and then 1.69 g of 10% Nafion solution in water. After filtration, the resultant ink was found to have the particle size distribution shown in FIG. 6 and given in Table 1 under Sample 5(c).

EXAMPLE 6

A black dispersion was prepared by mixing the following ingredients:
- (a) 7.7 g, of Platinum, nominally 60-wt % on carbon black (supplied by Cabot Superior Micropowders as Dynalyst™ 60K);
- (b) 12.13 g of Ethacryl MH dispersing agent at 33.5% active (supplied by Lyondell).
- (c) 50.2 g DI water.

The above components were mixed and then sheared using a Silverson Model L4R high shear mixer for 5 minutes at 9800 rpm. The mixture was transferred to an Eiger Mini Mill that was charged with 0.6 to 0.8 mm zirconium oxide beads and milled at 5000 rpm for 40 minutes. The dispersion was separated from the milling media by pumping the ink out of the mill. Particle size distributions were obtained using a Microtrac X100 Particle Analyzer after homogenizing the milled material through a Microfluidics Microfluidizer Model 110S fluid processor. The results are given in Table 1 for Sample 6(a).

The homogenized ink was filtered using a Whatman 5 micron filter and the resultant filtered ink had the particle size distribution given in Table 1 under Sample 6(b).

With 8.0 g of the filtered, homogenized ink was mixed 1.16 g of 10% Nafion solution in water. The resultant ink was found to have the particle size distribution given in Table 1 under Sample 6(c), from which it will be seen that the particles grew in size and the ink was unstable showing that addition of the Nafion solution (which is acidic, with pH of 1.57) to the unbuffered ink dispersion caused agglomeration of the particles.

Figure 7:
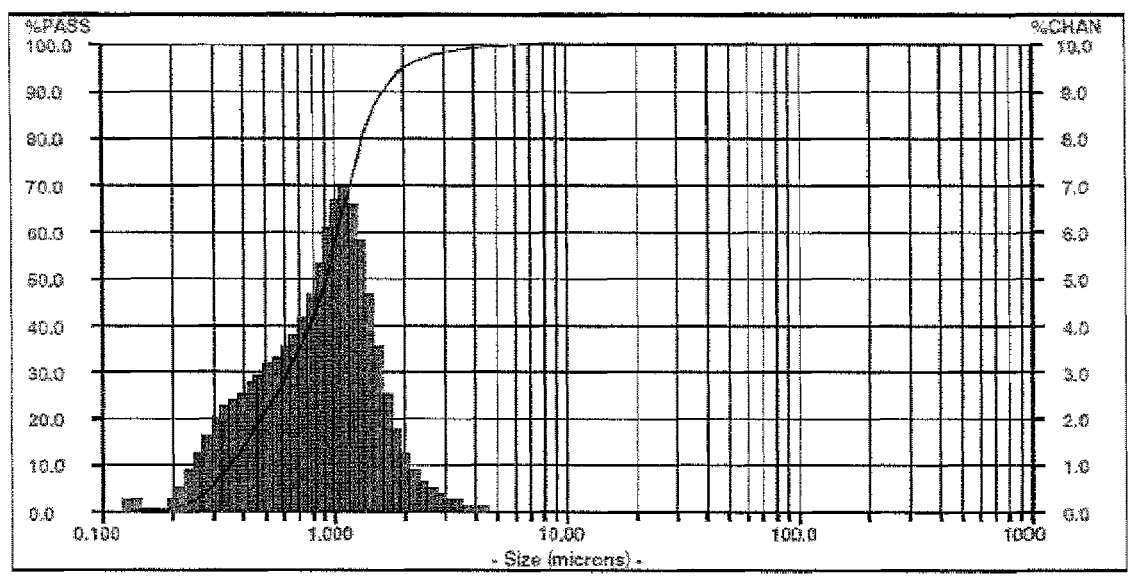
FIG. 7 is a graph showing the particle size distribution of the dispersion produced as Sample 5(c) in Example 5 employing a comb polymer dispersant.
Figure 8:
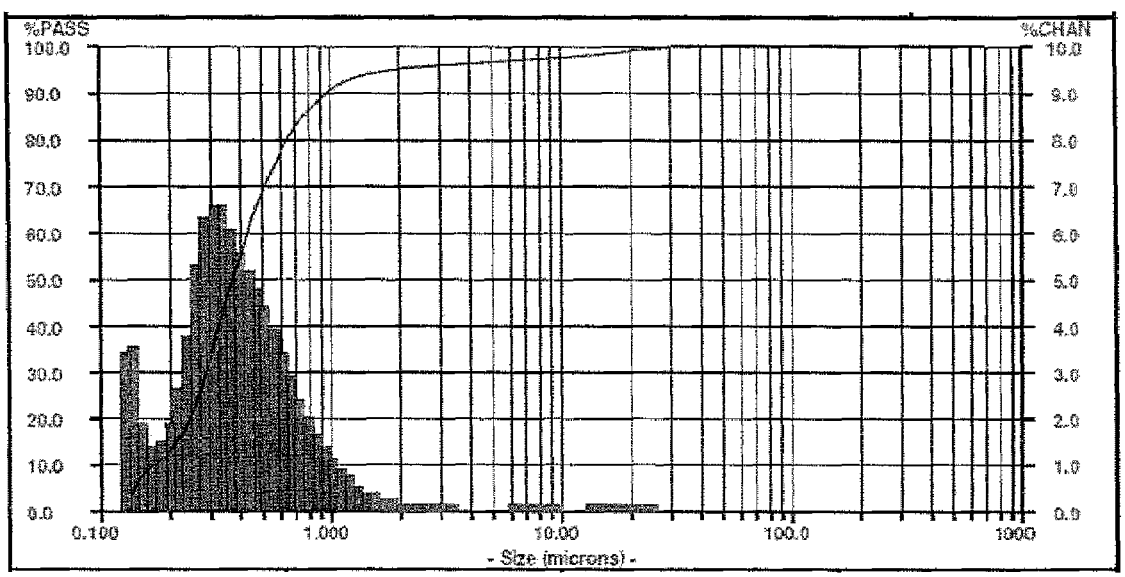
FIG. 8 is a graph indicating the particle size distribution of the dispersion produced as Sample 6(d) in Example 6 employing a comb polymer dispersant.

With 8.0 g of the filtered, homogenized ink were added 5.07 g of NH$_4$OH solution having pH 11.09 and then 1.16 g of 10% Nafion solution in water. After filtration, the resultant ink was found to have the particle size distribution shown in FIG. 7 and given in Table 1 under Sample 6(d).

It will be seen that the average particle size (d50) of each of the dispersions produced according to Examples 1 to 6 using comb polymer dispersants was significantly less than the average particle size of the dispersion produced according to the Comparative Example (with the polymethacylate dispersant) and the Control Example (with no dispersant). In addition, apart from the unbuffered Nafion-containing dispersion of Example 6, the particle size distribution (d95-d50) of each of the dispersions produced according to Examples 1 to 6 was significantly less than the particle size distribution of the dispersions produced in the Comparative and Control Examples.

TABLE 1

| Sample# | Dispersant | d(50) Mm | D(70) Mm | d(95) μm | Filter 5 μm | Nafion | Buffered NH$_4$OH | Stability |
|---|---|---|---|---|---|---|---|---|
| Control | None | 5.06 | 6.71 | 13.36 | No | No | | |
| Comparative | Darvan 821A | 3.71 | 4.61 | 7.65 | No | No | | |
| Sample 1(a) | Huntsman 85% SO3 | 0.36 | 0.44 | | No | No | | |
| Sample 1(b) | Huntsman 85% SO3 | 0.77 | 1.02 | 1.54 | No | No | | 8 days |
| Sample 1(c) | Huntsman 85% SO3 | 0.43 | 0.69 | 1.07 | Yes | No | | |
| Sample 2(a) | Huntsman Epoxide | 0.32 | 0.51 | 0.84 | No | No | | |
| Sample 2(b) | Huntsman Epoxide | 0.22 | 0.29 | 0.75 | No | No | | 8 days |
| Sample 2(c) | Huntsman Epoxide | 0.28 | 0.49 | 0.71 | Yes | No | | |
| Sample 3(a) | Huntsman X3204 | 0.30 | 0.43 | 0.88 | No | No | | |
| Sample 3(b) | Huntsman X3204 | 0.28 | 0.38 | 0.83 | Yes | No | | |
| Sample 3(c) | Huntsman X3204 | 0.29 | 0.34 | 0.81 | Yes | Yes | Yes | |
| Sample 4 | Huntsman X3204 | 0.31 | 0.40 | 1.14 | Yes | Yes | Yes | 3 days |
| Sample 5(a) | Lyondell Ethacryl P | 0.47 | 0.72 | 1.40 | No | No | | |
| Sample 5(b) | Lyondell Ethacryl P | 0.34 | 0.47 | 0.95 | Yes | No | | |
| Sample 5(c) | Lyondell Ethacryl P | 0.91 | 1.17 | 2.03 | Yes | Yes | Yes | |
| Sample 6(a) | Lyondell Ethacryl MH | 0.35 | 0.49 | 1.10 | No | No | | |
| Sample 6(b) | Lyondell Ethacryl MH | 0.28 | 0.37 | 1.14 | Yes | No | | |
| Sample 6(c) | Lyondell Ethacryl MH | 3.12 | 23.02 | 122.90 | No | Yes | No | Not Stable |
| Sample 6(d) | Lyondell Ethacryl MH | 0.37 | 0.51 | 1.78 | Yes | Yes | Yes | |

While the present invention has been described and illustrated by reference to particular embodiments, those of ordinary skill in the art will appreciate that the invention lends itself to variations not necessarily illustrated herein. For this reason, then, reference should be made solely to the appended claims or purposes of determining the true scope of the present invention.

The invention claimed is:

1. An electrocatalyst ink composition comprising a liquid vehicle, 10 to 60 wt % of the ink composition of particles comprising at least one electrocatalyst metal, and at least one polyoxyalkyleneamine comb-branched copolymer dispersant.

2. The ink composition of claim 1, wherein the liquid vehicle comprises at least 50% wt of water.

3. The ink composition of claim 1, wherein said at least one electrocatalyst metal is selected from platinum, silver, palladium, ruthenium, osmium and alloys thereof.

4. The ink composition of claim 1, wherein said at least one electrocatalyst metal is supported on a particulate carrier material.

5. The ink composition of claim 4, wherein the particulate carrier material comprises carbon or a metal oxide.

6. The ink composition of claim 1, wherein said particles have an average size less than 300 nm.

7. The ink composition of claim 1, wherein said particles have a density of about 5 to about 20 gm/cc.

8. The ink composition of claim 1, wherein said at least one electrocatalyst metal comprises 10 to 20 wt % of the ink composition.

9. The ink composition of claim 1, wherein the comb-branched copolymer dispersant has a molecular weight of from about 1,000 to about 100,000.

10. The ink composition of claim 1, wherein the comb-branched copolymer dispersant has a molecular weight of from about 5,000 to about 80,000.

11. The ink composition of claim 1, wherein the comb-branched copolymer dispersant has a molecular weight of from about 10,000 to about 50,000.

12. The ink composition of claim 1, wherein said polyoxyalkyleneamine comprises primary amino groups attached to the terminus of a polyether backbone.

13. The ink composition of claim 1, wherein the dispersant is water-soluble.

14. The ink composition of claim 1 and comprising greater than or equal to 30 parts by weight of the copolymer dispersant to 100 parts by weight of said particles comprising at least one electrocatalyst metal.

15. The ink composition of claim 1 and further comprising a proton-conducting polymer.

16. A method for the fabrication of an electrocatalyst layer, comprising the steps of: a) depositing an ink composition onto a substrate, said ink composition comprising a liquid vehicle, 10 to 60 wt % of particles comprising at least one electrocatalyst metal, and at least one polyoxyalkyleneamine comb-branched copolymer dispersant.

17. The method of claim 16, wherein said depositing step comprises depositing said ink composition using a direct-write tool.

18. The method of claim 17, wherein said direct-write tool is an ink-jet device.

19. The method of claim 16 and further comprising the step of washing the substrate after deposition of the ink composition to remove the dispersant.

20. The method of claim 16, wherein said substrate is an ion exchange membrane.

21. A catalyst coated membrane prepared by the method of claim 20.

22. A fuel cell comprising a catalyst coated membrane of claim 21.

* * * * *